(12) United States Patent
Korb et al.

(10) Patent No.: US 6,173,822 B1
(45) Date of Patent: Jan. 16, 2001

(54) ROTARY DAMPER

(75) Inventors: Holger M. Korb, Harthausen; Jürgen Fuss, Ochsenfurt, both of (DE)

(73) Assignee: ITW ATECO GmbH, Norderstedt (DE)

( * ) Notice: Under 35 U.S.C. 154(b), the term of this patent shall be extended for 0 days.

(21) Appl. No.: 09/169,985

(22) Filed: Oct. 13, 1998

(30) Foreign Application Priority Data

Oct. 11, 1997 (DE) .............................................. 197 45 038

(51) Int. Cl.⁷ ...................................................... F16F 9/14
(52) U.S. Cl. .......................... 188/307; 188/293; 188/296
(58) Field of Search .................................. 188/307, 306, 188/296, 293, 294

(56) References Cited

U.S. PATENT DOCUMENTS

| | | | |
|---|---|---|---|
| 3,709,335 | * | 1/1973 | Carlsson et al. ..................... 188/296 |
| 4,666,386 | * | 5/1987 | Winkler et al. ...................... 188/307 |
| 5,277,282 | | 1/1994 | Umemura . | 
| 5,449,054 | * | 9/1995 | Carlsson et al. ..................... 188/296 |

FOREIGN PATENT DOCUMENTS

| | | |
|---|---|---|
| 1 506 108 | 6/1969 | (DE) . |
| 196 15 208 | 10/1986 | (DE) . |
| 42 44 484 | 7/1992 | (DE) . |
| 195 48 921 | 7/1996 | (DE) . |
| 6-280918 | 7/1994 | (JP) . |

* cited by examiner

*Primary Examiner*—Robert J. Oberleitner
*Assistant Examiner*—Devon Kramer
(74) *Attorney, Agent, or Firm*—Schwartz & Weinrieb

(57) ABSTRACT

Rotary damper, in particular for an actuating member in motor vehicles, comprising a housing having a cylindrical damper chamber, a liquid viscous medium within the chamber, a rotatably supported shaft within the chamber having at least one substantially radially extending vane such that upon rotation of the shaft, displaced medium flows between a narrow passage between the cylindrical wall of the chamber and the free end of the vane, at least a radially outer portion of the vane being inclined with respect to a diameter extending through the base of the vane and in the circumferential direction and being bendable such that upon a rotation of the shaft in the inclination direction the vane is bent towards the cylindrical wall and upon an opposite rotation the vane is bent towards the shaft, wherein at least one locking cam is provided at the cylindrical wall of the chamber which extends radially inwards and is adapted to be engaged by the free end of the vane if it is bent towards the cylindrical wall a predetermined extent.

24 Claims, 2 Drawing Sheets

ROTARY DAMPER

FIELD OF THE INVENTION

The present invention relates to a rotary damper, in particular for the actuation of a part in motor vehicles.

BACKGROUND OF THE INVENTION

From DE 42 44 484 there has become known a rotary damper with which in a damping chamber which contains a viscous medium there is arranged a vane which is mounted upon shaft. With a rotation of the shaft the medium is displaced and flows between the end of the vane and the chamber wall. With the known rotary damper the vane is inclined towards one side in the circumferential direction and is deformable or bendable relative to the shaft in a manner such that it is pivoted towards the cylindrical chamber wall when the shaft undergoes rotation in the inclination direction is pivoted towards the shaft when shaft undergoes rotation in the opposite direction. By means of this structure a rotary damper is provided which in opposite rotational directions creates a damping effect of differing strength. With a pivoting of the vane in the direction of the chamber wall, the gap defined with respect to the wall is reduced so that a relatively high braking force is developed. If the shaft however is rotated in the opposite direction, the vane pivots in the direction of the shaft so that the distance of the vane to the cylindrical chamber wall is enlarged. By means of this structure a larger flow cross section is provided, and the rotational force in this direction is braked much less. As a result with such a rotary damper a type of free-running is created.

There are cases in which the braked movement of an actuated part is often not sufficient to prevent damage, for example with back rests or the like.

OBJECT OF THE INVENTION

It is therefore the object of the present invention to provide a rotary damper in particular for an actuation part in motor vehicles which prevents a braking deceleration or the amount of breaking action from exceeding a predetermined value.

With the rotational damper according to the present invention in the damping chamber there is arranged a locking cam which extends radially inwards and with which the free end of the vane comes into engagement when the vane is pivoted a predetermined amount towards the chamber wall. A pivoting of the vane towards the chamber wall is dependent on the torque or the acceleration of the rotor (the shaft plus the vane). If the acceleration reaches a certain value which possibly is critical for the actuation of the part to be actuated, the vane comes into engagement with the locking cam so that any further movement is completely blocked. As soon as the deceleration or braking action is zero the vane may retract from the part locking cam and as a result is again released. The movement of the part to be actuated may as a result be continued.

It is to be understood that with several vanes to each one there may be allocated a locking cam. Also a number of locking cams may be provided which is a multiple of the number of vanes. This is advantageous when a very rapid stop is to be obtained on reaching the predetermined acceleration.

In one embodiment of the present invention it is provided that on one side of the vane a support rib or likewise is mounted on the shaft in such a manner that the vane bears against the support rib when it is pivoted towards the chamber wall by a predetermined amount. The support rib has the object of preventing the vane from being bent through and at the same time rattling past the locking cam. The rib thus fulfills the object of preventing a rotation beyond the locking position.

BRIEF DESCRIPTION OF THE DRAWINGS

One embodiment example of the present invention is hereinafter explained in more detail by means of the subsequent detailed description which is to be considered in connection with the accompanying drawings in which like reference characters designate like or corresponding parts throughout the several views, and wherein.

DETAILED DESCRIPTION OF THE INVENTION

Figure 1:
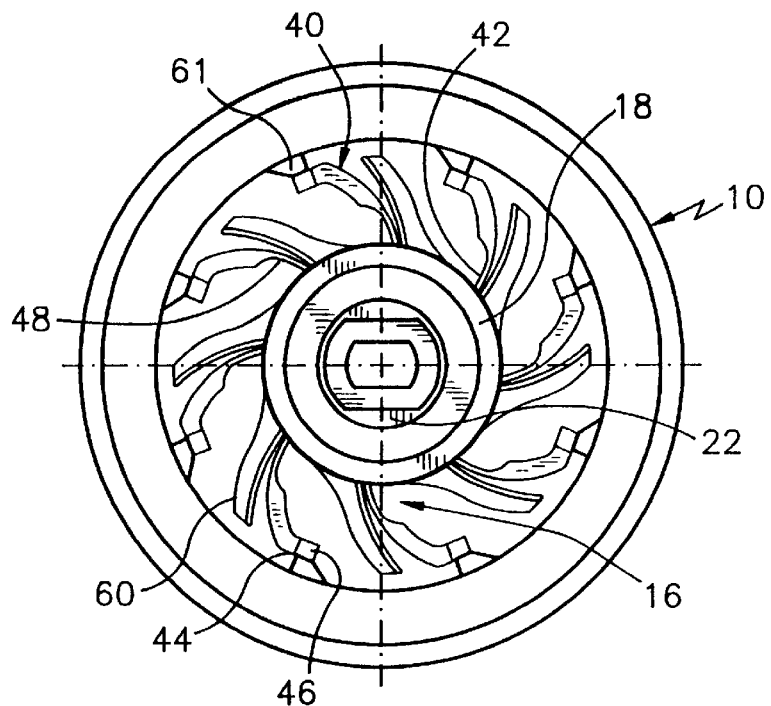
FIG. 1 is a section through a rotary damper according to the present invention, in the resting condition.
Figure 2:
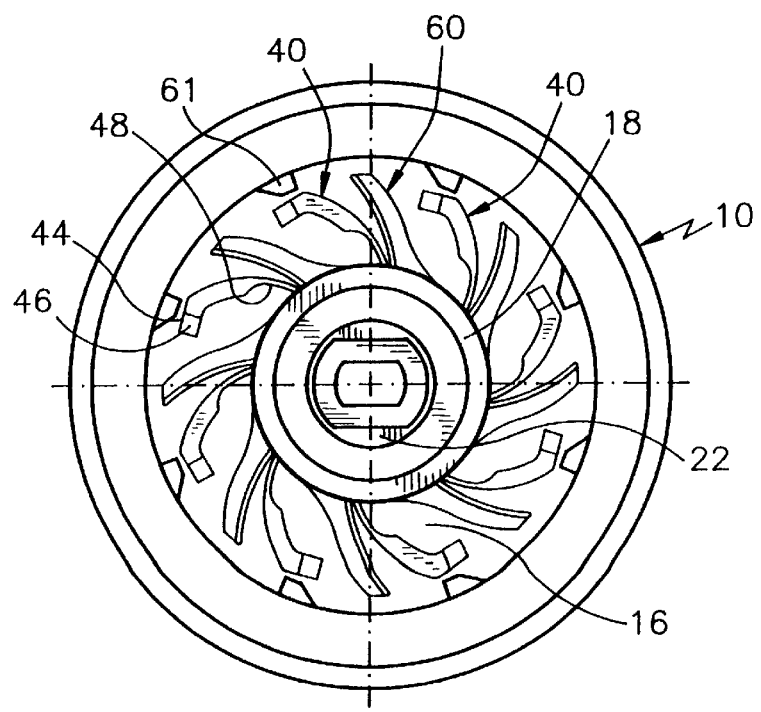
FIG. 2 shows the rotary damper according to FIG. 1 with a rotation of the rotor in the clockwise direction.
Figure 3:
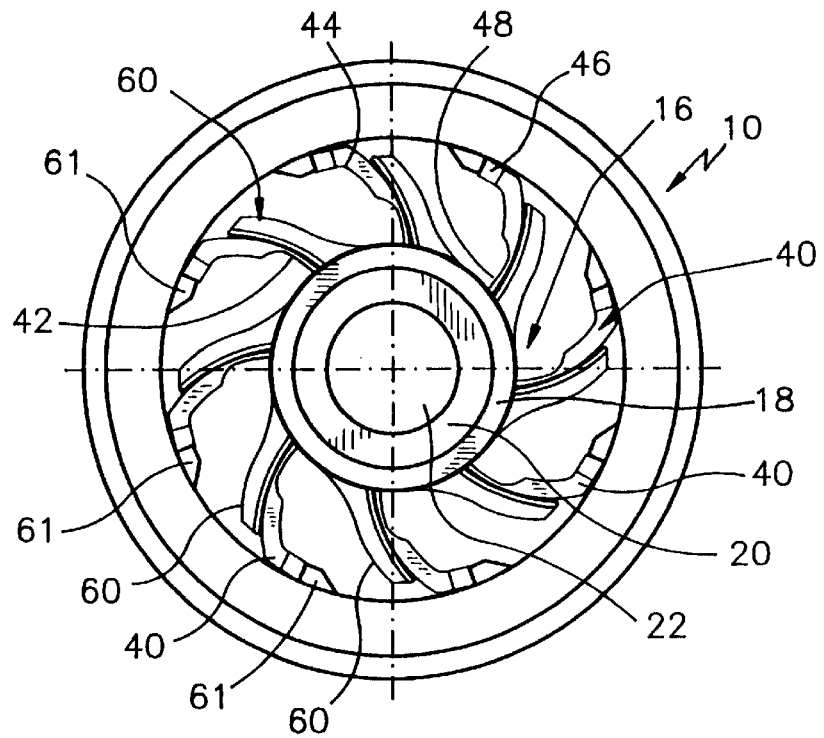
FIG. 3 shows the rotary damper according to FIG. 1 with a rotation in the anticlockwise direction.

The rotary damper represented in the FIGS. 1 to 3 comprises a pot-like housing 10 which at the open side is closed with a lid (not shown). In the housing 10 there is located a fluid (not shown), for example, silicone oil. In the housing 10 there is arranged a rotor 16 which comprises a cylindrical section 18 which is connected by means of a radial section 20 between the ends to a shaft 22. The cylindrical section 18 extends approximately between the floor, not shown, of the pot-like housing 10 and the lid. The shaft 22 extends through a central opening of the lid (not shown). On the outerlying section of the shaft 22 a pinion may be mounted in a rotationally secure manner. On the opposite side of the wall 20 there is formed an accommodating chamber 30 for an axial collar of the housing 10, which is not shown. The construction described up to now is of no particular importance and is otherwise known from DE 42 44 484.

Figure 4:
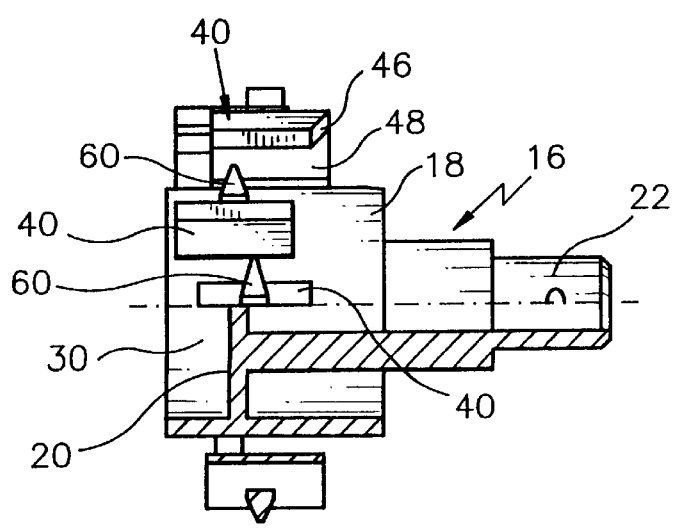
FIG. 4 shows the lateral view of the rotor of the rotary damper according to the FIGS. 1 to 3, partly in section.

On the circumference of the cylindrical section 18 there are arranged a row of vanes 40. The shape of the vanes 40 can be clearly deduced from the FIGS. 1 to 3. They are slightly curved and inclined to one rotational direction, that is, counterclockwise, that is, away from the diameter which goes through the respective base section 42. The free end is curved more heavily but however comprises an oblique surface section 44 on the outer side. Neighboring vanes 40 are laterally displaced as can be deduced from FIG. 4. On the outer sides the ends comprise inclinations 46 which alternately run on the one or the other side. They favour the meandering course of the flow between the vanes 40 when the rotor 16 is rotated in the housing 10.

The vanes 40 which are formed as one part with the rotor 16 from plastic, comprise weakened portions 48 near to the base section 42. The weakened portions 48 simplify a pivoting of the vanes 40 in the direction of or toward the rotor 16 when this rotor 16 is rotated in the clockwise direction. This is to be recognized in FIG. 2. FIG. 1 shows the rotor 16 at a standstill. By means of this structure between the free ends of the vanes 40 and the cylindrical wall of the chamber of housing 10, a more or less large passage is formed, so that the rotor 16 may be rotated relatively easily (free-running). In the reverse direction on the other hand essentially only the described flow path laterally past the vanes 40 is possible, so that a relatively strong braking effect occurs. With an even stronger rotation there is effected a deformation of the vanes 40 in a manner such that the vanes 40 abut against radially disposed abutment surfaces of cams 61 which are arranged on the inner side of the housing 10. The abutment surface of the cams 61 and the vanes 40 is such that on abutting they bear against one another in a relatively flush manner. On the end which is distant to the abutment surface the cams 61 are formed in a ramp-like manner. By way of this structure, with rotation of the rotor 16 in the clockwise direction there is formed a sliding surface.

In each case a support rib 60 is allocated to a vane 40, each support rib 60 being similarly inclined as the vane 40 and extending approximately up to the circle on which the radially inner lying surfaces of the cams 61 lie. The support ribs 60 are relatively narrow as can be appreciated from FIG. 4 and taper in a triangular manner in the clockwise direction. By way of this structure the support ribs 60 only apply a relatively slight braking moment with respect to the free-running rotation (FIG. 2). With an opposite rotation the ribs 60 serve for supporting the vanes 40 when these abut against the cams 61 (FIG. 3). Continued rotation of the rotor 16 in the counterclockwise direction is prevented once the vanes 40 have engaged or come into abutment with the cams 61, in that the vanes 40 would normally fold or bend, however, folding or bending of the vanes 40 around or at the weakened portions 48 is effectively prevented by engagement of the vanes 40 with the support ribs 60. The vanes 40 are thus effectively trapped between the cams 61 and the support ribs 60.

Once the vanes 40 have engaged the cams 61, the vanes 40 can be released from their engagement with the cams 61 as a result of a slight rotation of the rotor 16 in the clockwise direction which disengaged the vanes 40 form the cams 61, and permits the vanes 40 to radially contract slightly as a result of the normal resiliency thereof about the weakened portions 48. Further normal rotation of the rotor 16 in the counterclockwise direction may then continue.

Obviously, many modifications and variations of the present invention are possible in light of the above teachings. It is therefore to be understood that within the scope of the appended claims, the present invention may be practiced otherwise than as specifically described herein.

What is claimed is:

1. A rotary damper, comprising:

a housing having a cylindrical damping chamber defined by a cylindrical wall;

a viscous liquid medium disposed within said chamber;

a rotatably supported shaft disposed within said chamber;

at least one substantially radially extending vane mounted upon said shaft such that upon rotation of said shaft, said viscous liquid medium is displaced and flows between a narrow passage defined between said cylindrical wall of said chamber and a free distal end of said vane;

said at least one substantially radially extending vane having a radially outer portion which is inclined in a first circumferential direction with respect to a diameter extending through a base portion of said vane and which is bendable in opposite circumferential directions such that upon rotation of said shaft in said first circumferential direction, said at least one vane is bent towards said cylindrical wall so as to effectively reduce said narrow passage defined between said cylindrical wall of said chamber and said free distal end of said at least one vane and thereby increase the damping action of said rotary damper, whereupon rotation of said shaft in a second opposite circumferential direction, said at least one vane is bent towards said shaft so as to effectively increase said narrow passage defined between said cylindrical wall of said chamber and said free distal end of said at least one vane and thereby decrease the damping action of said rotary damper; and at least one locking cam is disposed upon said cylindrical wall of said chamber and extending radially inwards so as to be engaged by said free end of said at least one vane if said at least one vane is bent toward said cylindrical wall beyond a predetermined extent.

2. The rotary damper of claim 1, wherein:

said at least one vane comprises a plurality of vanes; and said at least one locking cam comprises a plurality of locking cams wherein the number of said locking cams corresponds to the number of said vanes and wherein further, said vanes and said locking cams are equiangularly spaced in a circumferential array.

3. The rotary damper of claim 1, wherein:

said at least one locking cam comprises a radially extending abutment surface for engaging said free end of said at least one vane, and a ramp-shaped portion which ascends toward said radially extending abutment surface of said cam.

4. The rotary damper of claim 1, wherein:

a substantially radially extending supporting rib is fixedly mounted upon said shaft and upon one circumferential side of said at least one vane such that said at least one vane engages said supporting rib only if said at least one vane is toward said cylindrical chamber wall a predetermined extent.

5. The rotary damper of claim 4, wherein:

the engagement of said at least one vane with said supporting rib takes place only after said free end of said at least one vane has engaged said at least one locking cam.

6. The rotary damper of claim 1, wherein:

said free end of said at least one vane comprises an oblique surface having an inclination relative to the longitudinal extension of said at least one vane such that said oblique surface completely engages an associated engagement surface of said at least one locking cam upon corresponding deformation of said at least one vane.

7. The rotary damper of claim 1, wherein:

when said at least one vane is disposed in a rest state, said at least one vane extends radially so as to be disposed substantially adjacent to said at least one locking cam.

8. The rotary damper of claim 1, wherein:

said rotary shaft and said at least one vane are integrally formed of plastic material.

9. The rotary damper of claim 4, wherein:

said supporting rib is triangular in cross-section with the apex of the triangle extending in a direction opposite to said first inclination direction of said at least one vane.

10. The rotary damper of claim 1, wherein:

said at least one vane has a weakened cross-sectional portion disposed adjacent to said base portion of said at least one vane so as to facilitate the bending of said at least one vane in said opposite circumferential directions.

11. The rotary damper of claim 1, wherein:
said at least one vane has an arcuate configuration.
12. The rotary damper of claim 2, wherein:
adjacent vanes, of said plurality of vanes and as considered in a circumferential direction, are axially offset with respect to each other.
13. The rotary damper of claim 12, wherein:
lateral side portions of said plurality of vanes are provided with inclined surfaces so as to facilitate flow of said viscous liquid medium in a substantially sinusoidal pattern around said plurality of vanes.
14. The rotary damper of claim 1, wherein:
said at least one locking cam is integrally formed with said housing.
15. A rotary damper for use in connection with the actuation of a rotary member within a motor vehicle, comprising:
a housing having a cylindrical damping chamber defined by a cylindrical wall;
a viscous liquid medium disposed within said chamber;
a rotatably supported shaft disposed within said chamber;
at least one substantially radially extending vane mounted upon said shaft such that upon rotation of said shaft, said viscous liquid medium is displaced and flows between a narrow passage defined between said cylindrical wall of said chamber and a free distal end of said vane;
said at least one substantially radially extending vane having a radially outer portion which is inclined in a first circumferential direction with respect to a diameter extending through a base portion of said vane and which is bendable in opposite circumferential directions such that upon rotation of said shaft in said first circumferential direction, said at least one vane is bent towards said cylindrical wall so as to effectively reduce said narrow passage defined between said cylindrical wall of said chamber and said free distal end of said at least one vane and thereby increase the damping action of said rotary damper, whereupon rotation of said shaft in a second opposite circumferential direction, said at least one vane is bent towards said shaft so as to effectively increase said narrow passage defined between said cylindrical wall of said chamber and said free distal end of said at least one vane and thereby decrease the damping action of said rotary damper; and
at least one locking cam disposed upon said cylindrical wall of said chamber and extending radially inwards so as to be engaged by said free end of said at least one vane if said at least one vane is bent toward said cylindrical wall beyond a predetermined extent.
16. The rotary damper of claim 15, wherein:
said at least one vane comprises a plurality of vanes; and
said at least one locking cam comprises a plurality of locking cams wherein the number of said locking cams corresponds to the number of said vanes and wherein further, said vanes and said locking cams are equiangularly spaced in a circumferential array.
17. The rotary damper of claim 15, wherein:
said at least one locking cam comprises a radially extending abutment surface for engaging said free end of said at least one vane, and a ramp-shaped portion which ascends toward said radially extending abutment surface of said cam.
18. The rotary damper of claim 15, wherein:
a substantially radially extending supporting rib is fixedly mounted upon said shaft and upon one circumferential side of said at least one vane such that said at least one vane engages said supporting rib only if said at least one vane is bent toward said cylindrical chamber wall a predetermined extent.
19. The rotary damper of claim 15, wherein:
when said at least one vane is disposed in a rest state, said at least one vane extends radially so as to be disposed substantially adjacent to said at least one locking cam.
20. The rotary damper of claim 15, wherein:
said rotary shaft and said at least one vane are integrally formed of plastic material.
21. The rotary damper of claim 15, wherein:
said at least one vane has a weakened cross-sectional portion disposed adjacent to said base portion of said at least one vane so as to facilitate the bending of said at least one vane in said opposite circumferential directions.
22. The rotary damper of claim 16, wherein:
adjacent vanes, of said plurality of vanes and as considered in a circumferential direction, are axially offset with respect to each other.
23. The rotary damper of claim 22, wherein:
lateral side portions of said plurality of vanes are provided with inclined surfaces so as to facilitate flow of said viscous liquid medium in a substantially sinusoidal pattern around said plurality of vanes.
24. The rotary damper as set forth in claim 15, wherein:
said rotary member of said motor vehicle comprises a back rest.

\* \* \* \* \*